United States Patent [19]

Yamano et al.

[11] Patent Number: 4,676,325
[45] Date of Patent: Jun. 30, 1987

[54] COMBINATION WEIGHING METHOD WITH TWO DISCHARGE PATHS AND TWO TARGET WEIGHTS

[75] Inventors: Shoji Yamano, Akashi; Isao Miyamoto, Himeji, both of Japan

[73] Assignee: Yamato Scale Company, Limited, Akashi, Japan

[21] Appl. No.: 857,248

[22] Filed: Apr. 30, 1986

[30] Foreign Application Priority Data

May 10, 1985 [JP] Japan ............................ 60-100334
May 10, 1985 [JP] Japan ............................ 60-100336

[51] Int. Cl.$^4$ ............................................ G01G 19/22
[52] U.S. Cl. ............................................ 177/1; 177/25
[58] Field of Search ................................ 177/1, 25

[56] References Cited

U.S. PATENT DOCUMENTS

| | | | |
|---|---|---|---|
| 4,399,880 | 8/1983 | Konishi | 177/25 X |
| 4,437,527 | 3/1984 | Omae et al. | 177/25 |
| 4,446,938 | 5/1984 | Kawanishi | 177/25 |
| 4,544,042 | 10/1985 | Mikami | 177/25 |
| 4,558,774 | 12/1985 | Mikami | 177/25 X |
| 4,570,727 | 2/1986 | Ueda | 177/25 |
| 4,574,897 | 3/1986 | Minamida et al. | 177/25 |
| 4,602,709 | 7/1986 | Ueda et al. | 177/25 X |
| 4,618,012 | 10/1986 | Yamano et al. | 177/25 |

Primary Examiner—George H. Miller, Jr.
Attorney, Agent, or Firm—Senniger, Poweers, Leavitt and Roedel

[57] ABSTRACT

A combination weighing method using a combination weighing machine comprising a plurality of weighing hoppers for weighing product and a plurality of auxiliary hoppers located under respective weighing hoppers for receiving weighed product discharged therefrom. The weights of product are initially stored in weighing hopper memories corresponding to the respective weighing hoppers and then transferred to auxiliary hopper memories weighed product is discharged into the auxiliary hoppers and the emptied weighing hoppers are automatically reloaded with fresh product to be weighed. At least the weight values stored in the auxiliary hopper memories are combined for selecting from the resultant combinations a combination whose sum weight satisfies a predetermined weight condition. The contents of the auxiliary hoppers corresponding to the selected combination are discharged into a collection chute for packing and the emptied auxiliary hoppers are reloaded from the corresponding weighing hoppers. Before completion of the reloading operation, the next combination selection operation is effected in a similar manner using the weight values not selected in the preceding combination search and the resultant selected combination is discharged into another collection chute. The predetermined weight condition includes two target weights and two kinds of batches having different target weights are alternately delivered via the two collection chutes.

24 Claims, 10 Drawing Figures

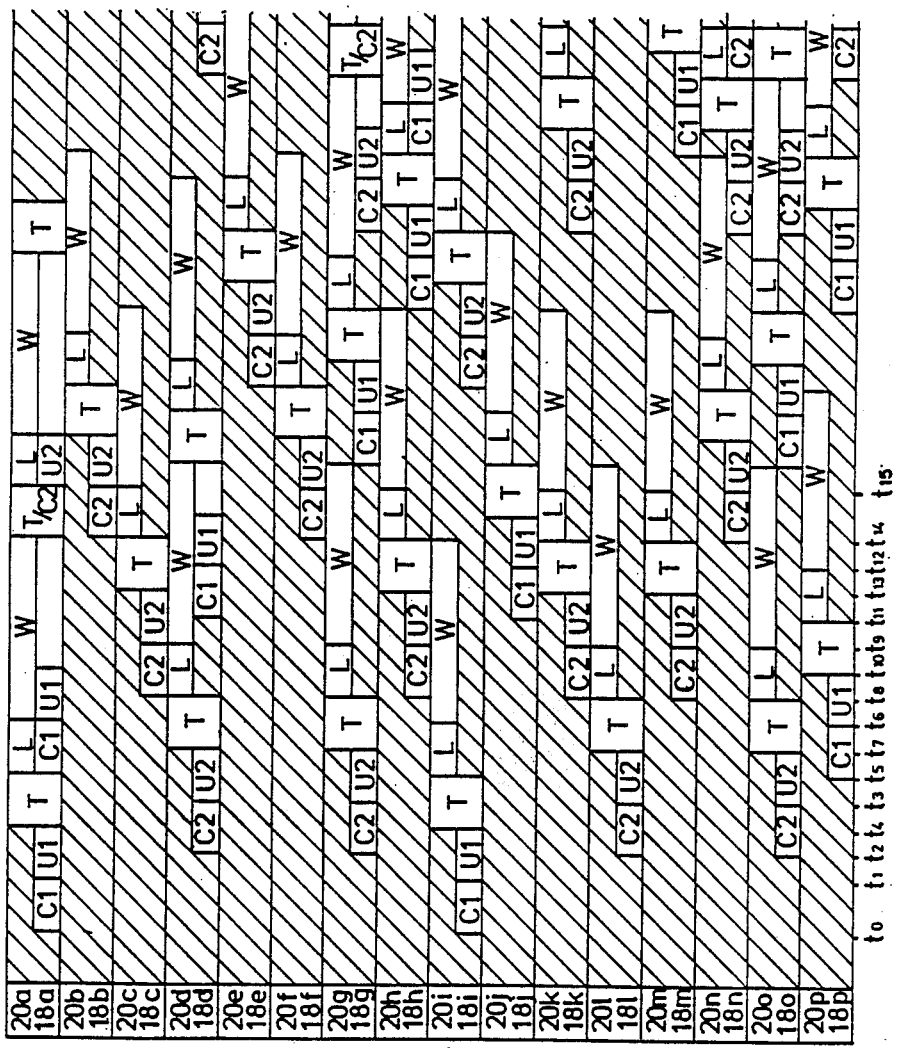

C1 : COMBINATION FOR INNER CHUTE
C2 :      "          "   OUTER   "
U1 : UNLOADING INTO INNER CHUTE
U2 :      "         "  OUTER   "
L  : LOADING
W  : WEIGHING
T  : TRANSFER INTO AUX. HOPPER

4,676,325

COMBINATION WEIGHING METHOD WITH TWO DISCHARGE PATHS AND TWO TARGET WEIGHTS

BACKGROUND OF THE INVENTION

This invention relates to a combination weighing method for automatically weighing out batches of product with a predetermined target weight, using a combination weighing machine. In particular, this invention relates to such method improved to be able to use two target weights at the same time.

Among the prior art combination weighing methods, one method involves utilizing a plurality of weighing units each adapted to weigh a fraction of the weight to be delivered and each adapted for unloading of product therefrom to contribute to a delivery. The method comprises for each delivery the steps of generating the values of combinations of weights on the weighing units which were unloaded in the preceding delivery and comparing the values with an acceptable weight standard relating to a predetermined target weight to select a combination of weighing units to be unloaded to deliver a sum weight equal or approximate to the target weight, unloading the weighing units of the selected combination, loading the weighing units which were unloaded, and wherein, for each delivery, the step of generating and comparing the values of the combinations of weights on the weighing units excluding those units which were unloaded on the preceding delivery is initiated before completion of weighing out new loads in those weighing units. An example of this method is disclosed in coassigned U.S. Pat. Nos. 4,385,671 and 4,470,166.

In another prior art method, a plurality of weighing hoppers, each having a weight sensor, is provided. Each weighing hopper is associated with an auxiliary hopper, and an auxiliary hopper memory is provided corresponding to each auxiliary hopper. Product is weighed by each weighing unit and the product weight then transferred to the associated auxiliary hopper memory. The stored values are combined in various fashion to obtain a combination having a weight equal or approximate to a predetermined target weight. An example of such method is disclosed in coassigned U.S. Pat. Nos. 4,437,527 and 4,446,938.

According to the above method of the '671 patent, it is possible to increase the number of deliveries of product per unit time to obtain high speed operation. However, this speed of operation or rate of delivery is naturally limited by the use of a single collection chute for collecting batches of product discharged from selected hoppers, since operation at speeds above a certain limit results in unavoidable intermixture of the successive deliveries of product on the chute. One solution of this problem is disclosed in the opened Japanense patent specification No. 58-2621. In this case, the combination weighing machine includes two collection chutes and is designed to discharge successive deliveries of product" alternately into either chute.

In practice, it is often required to weigh out the same product using two or more target weights, as where different packages of varying weights are required. In the prior art, however, it is necessary to use two or more combination weighing machines in parallel to accomplish this. If the device of above-cited Japanese specification could deliver product from two collection chutes with different total weight values, it would be effective to execute the required operation.

Accordingly, an object of this invention is to provide an improved method for executing combination computation using two preset target weights to provide two kinds of deliveries of product having different total weights through two collection chutes of such a combination weighing machine as disclosed in the above-cited Japanese patent specification.

SUMMARY OF THE INVENTION

This object can be attained by a method of this invention using a combination weighing machine including a plurality of weighing hoppers, a plurality of auxiliary hoppers associated respectively with said weighing hoppers for receiving product from the corresponding weighing hoppers, and two devices for receiving discharged product. The method comprises a first step of feeding empty auxiliary hoppers with product from the corresponding weighing hoppers, a second step of feeding the empty weighing hoppers with new product to be weighed, and a third step executed in parallel with these feeding and weighing steps for combining at least the weights of product already been fed to the auxiliary hoppers to select from the resultant combinations a combination whose sum weight is equal or approximate to a predetermined target weight and to discharge the product of the selected combination into both receiving devices alternately. As a feature of this invention, the target weight is changed alternately every combination selection and discharge step.

These and other objects and features of this invention will be described below with reference to the accompanying drawings.

BRIEF DESCRIPTION OF THE DRAWINGS

In the drawings:

FIGS. 4 to 7(a) and 7(b) are flow charts illustrative of the steps of first and second embodiments of the method according to this invention;

FIG. 8 is a timing diagram representing an operation of the combination weighing maching operated in the first embodiment of this invention.

DESCRIPTION OF THE PREFERRED EMBODIMENTS

Figure 1:
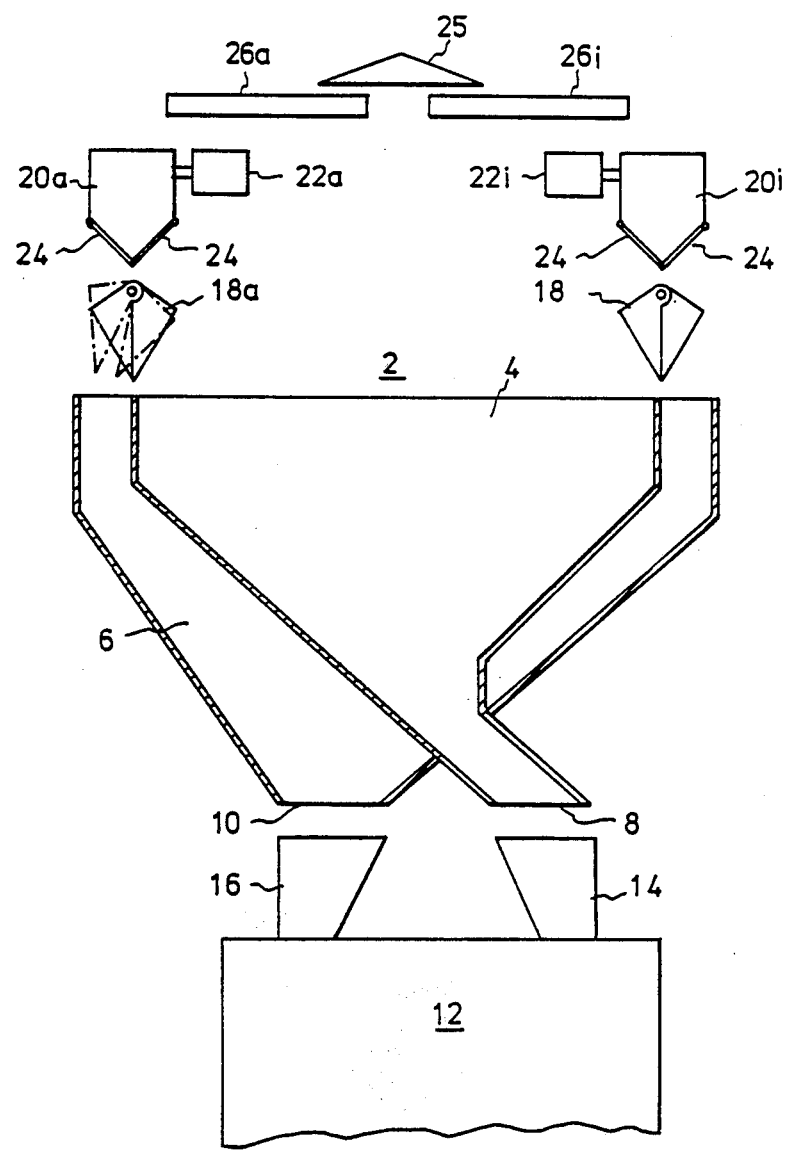
FIG. 1 is a schematic partially sectional side view representing a mechanical arrangement of a combination weighing machine used in the method of this invention.
Figure 2:
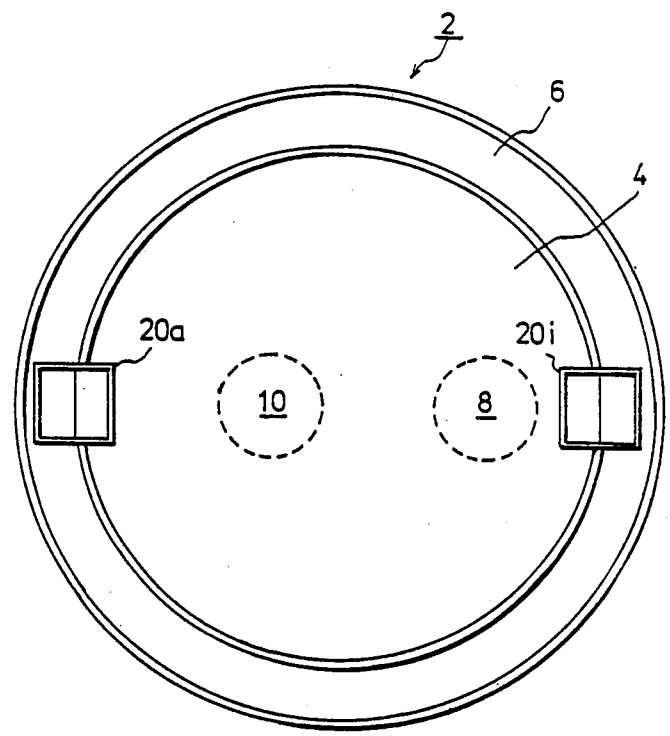
FIG. 2 is a schematic plan view of the machine of FIG. 1.

Referring to FIGS. 1 and 2, a combination weighing machine used for carrying out the method of this invention includes a double collecting chute 2 composed of two funnel-like inner and outer chutes 4 and 6 which are arranged substantially coaxially but have separate outlet ports 8 and 10 at their bottoms, respectively. A receiving device 12 such as packing machine (only a part of which is shown schematically) is disposed thereunder so that its two receiving mouths 14 and 16 face are directly below outlet ports 8 and 10.

A plurality of, sixteen in this case, auxiliary hoppers 18a, 18b, . . . 18p are arranged circularly above the peripheral edge of the inner chute 4. Each auxiliary hopper has a single double-jaw discharge gate at its bottom. The arrangement is such that the jaws of the gate pivot open toward the outer chute 6 as shown in phantom when the content is to be discharged into the outer chute, and pivot open toward the inner chute 4 in similar fashion when the content is to be discharged into the inner chute.

Sixteen weighing hoppers 20a, 20b, . . . 20p are arranged respectively above the auxiliary hoppers 18a, 18b, . . . 18p, and are provided respectively with weight sensors 22a, 22b, . . . 22p, such as load cells. The weighing hoppers 20a, 20b, . . . 20p are adapted to weigh product fed from a conical dispersion table 25 through corresponding radial trough feeders 26a, 26b, . . . 26p, and are adapted to discharge the weighed contents into the underlying auxiliary hoppers through their double-door type gates 24, respectively. In the drawings, only diametrical pairs of such components as the hoppers and the trough feeders are shown for simplification.

Figure 3:
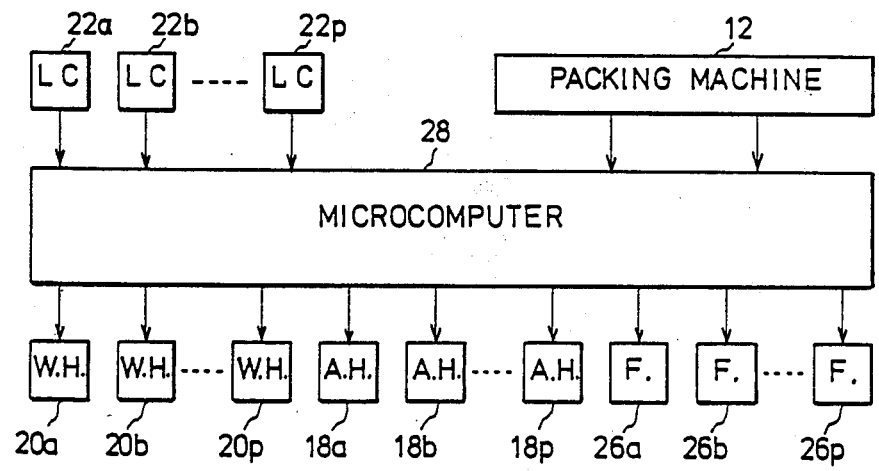
FIG. 3 is a block diagram representing a circuitry arrangement used in the machine of FIGS. 1 and 2.

As shown in FIG. 3, the auxiliary hoppers 18a, 18b, . . . 18p, the weighing hoppers 20a, 20b, . . . 20p and the trough feeders 26a, 26b, . . . 26p are coupled to a microcomputer 28 and controlled thereby. The microcomputer 28 receives weight signals from the load cell weight sensors 22a, 22b, . . . 22p and computes predetermined combinations of these weight signals to select a combination, every cycle, which satisfies a predetermined condition. The microcomputer 28 also receives first and second delivery permission signals from the packing machine 12 in alternating fashion at constant intervals such as 0.15 second and, in response thereto, provides an inner or outer discharge command signal to the selected auxiliary hoppers every cycle. In response to the inner or outer discharge command signal, the selected auxiliary hoppers are driven by suitable mechanisms (not shown) to slant (pivot) toward the inner or outer chute to discharge their contents to the specified chute.

Upon completion of this discharge or unloading step, the microcomputer 28 provides a discharge end signal to these auxiliary hoppers to close their gates and restore them to their original positions as shown by solid line in FIG. 1. Following the end signal, the microcomputer 28 provides a transfer signal to the weighing hoppers corresponding to the emptied auxiliary hoppers to open their gates to transfer their contents to the underlying auxiliary hoppers. Upon completion of transfer, the microcomputer 28 provides a transfer end signal to these weighing hoppers to close their gates. Following this end signal, the microcomputer 28 provides a loading signal to the trough feeders corresponding to the emptied weighing hoppers to vibrate them for a predetermined time to feed a predetermined amount of new product to these weighing hoppers, which are weighed by the associated load cells.

As an aid to the following description, it is now assumed that it takes about 0.2 second to transfer the content of each weighing hopper to the corresponding auxiliary hopper, about 0.2 second to load each emptied weighing hopper with new product by the associated trough feeder and about 0.7 second until stabilization of the weight signal is obtained after the end of the loading step. Therefore, the time interval for the unloading, reloading and weighing steps for each weighing hopper, which will be hereinafter referred to as "one weighing cycle", is about 1.1 seconds in total.

It is also assumed that all the auxiliary hoppers 18a, 18b, . . . 18p and weighing hoppers 20a, 20b, . . . 20p have been loaded and that the weights of product in these auxiliary and weighing hoppers are stored, respectively, in auxiliary and weighing hopper memories built in the microcomputer 28. While, in the execution of the program, such flags as weighing end flags (WEF), unloading participation flags (UPF) and unloading flags (ULF) for respective weighing hoppers, empty flags (EMF) and inner and outer unloading flags (IUF and OUF) for respective auxiliary hoppers, computation end flags (CEF) and loading device flags (LDF) are used, it is further assumed that all the weighing end flags (WEF) have been set and all other flags have been reset. Under this condition, the microcomputer 28 initiates an arithmetic or computation sequence as shown in FIG. 4.

Figure 6:
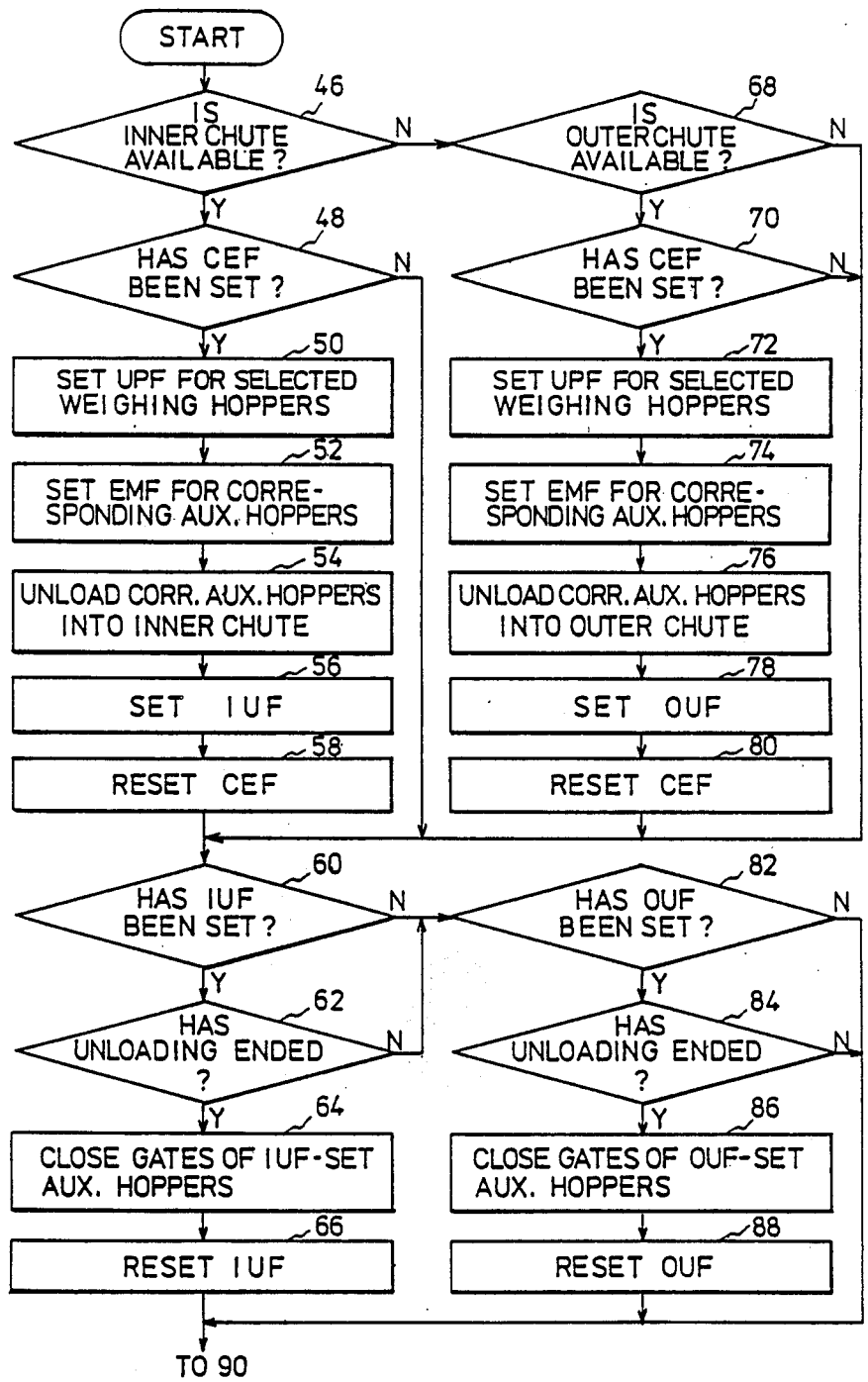

The microcomputer 28 executes a computation sequence repeatedly and, when an interrupt signal is provided during this execution, it interrupts this sequence and executes an interrupt sequence composed of an auxiliary hopper sequence of FIG. 6 and a weighing hopper sequence and, upon completion of the interrupt sequence, resumes the computation sequence. The arrangement is such that the interrupt signal is provided at 0.01 second intervals, for example.

Figure 4:
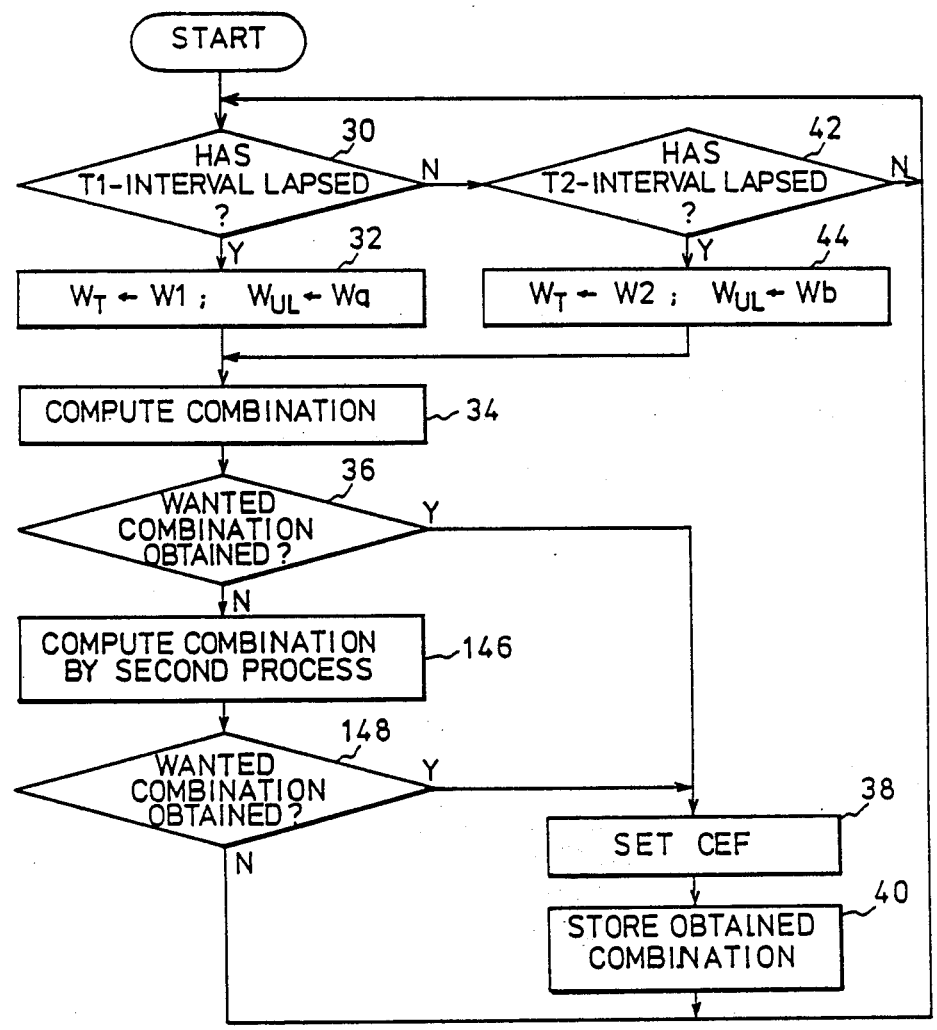

In FIG. 4, it is first inquired, in step 30, whether a first predetermined time interval T1, 0.6 second for example, has elapsed after the beginning of unloading into the inner chute 4 of the collection chute assembly 2, or not. For the first cycle of operation of the machine, the answer is assumed to be "YES". Therefore, the next step 32 is executed to set a predetermined weight value W1 as target weight $W_T$ and another predetermined weight value Wa which is greater than W1 is set as an allowable upper limit $W_{UL}$ and, in step 34, first combination computation is effected. In the combination computation, the weight values stored in the weighing hopper memories and the auxiliary hopper memories are combined sequentially as described below with reference to FIG. 5 and a combination whose sum weight is equal or nearest to the target weight W1 is selected from the resultant combinations.

Figure 5:
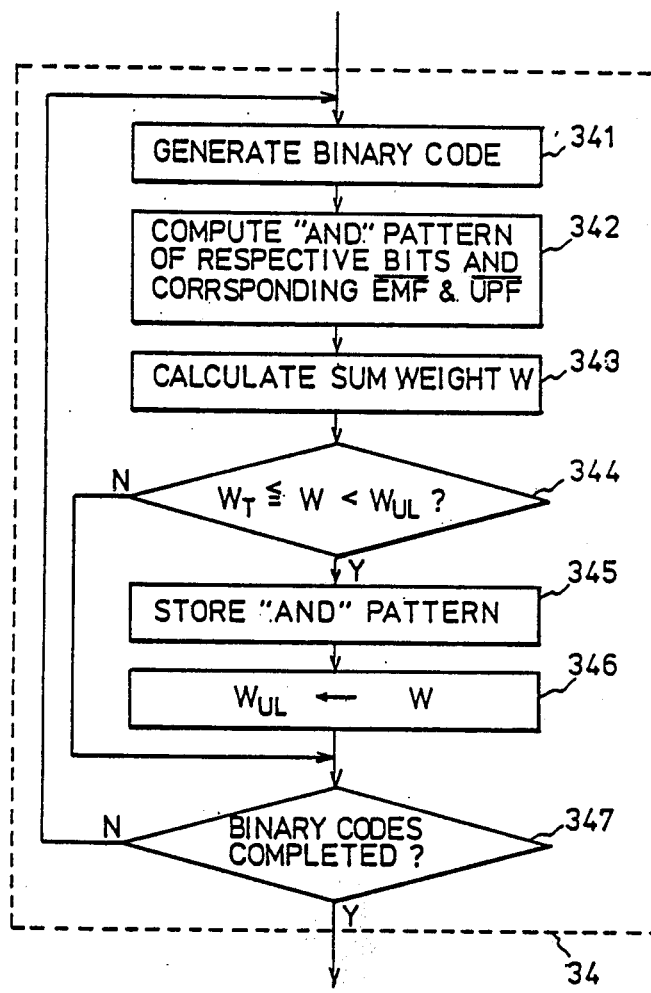

As shown in FIG. 5, the step 34 consists of substeps 341 to 347. In step 341, n-bit binary codes are sequentially generated. The number n is equal to the total number of the weighing and auxiliary hoppers, which is thirty-two (32) in this embodiment. In step 342, logic products (ANDs) of respective bits of the currently provided binary code and complements of the empty flags ($\overline{EMF}$) or unloading participation flags ($\overline{UPF}$) of the corresponding auxiliary or weighing hoppers are calculated respectively. The logic high level "1" of EMF flag means the corresponding auxiliary hopper is empty and is thus inhibited from participating in the combination computation and the same level "1" of UPF flag means the corresponding weighing hopper has been selected in the preceding combination and is also inhibited from participating in the present combination computation. It is therefore understood that the calculated logic products involving such inhibited hoppers are "0" regardless of the binary code.

In step 343, the weight values stored in those weighing and auxiliary hopper memories corresponding to the calculated logic products of "1" are summed to provide a total weight value W. Then, it is inquired, in step 344, whether the value W falls between the target weight $W_T$ and the upper upper limit $W_{UL}$ or not. If "YES", the calculated logic product (AND) pattern is stored in memory in step 345 and the upper limit $W_{UL}$ is updated or substituted with the current sum weight W in step 346. If the answer is "NO" in step 344, steps 345 and 346 are not executed. Finally, in step 347, it is inquired whether the predetermined binary codes have been completely generated and examined or not. If "YES", the next step 36 of FIG. 4 is executed but, if "NO", the abovementioned steps 341 to 347 are repeated. During execution of the combination computation step 34, the upper limit $W_{UL}$ in step 344 gradually approaches the target weight $W_T(=W1)$ and, at the end of the step 34, the stored logic product pattern represents a combination pattern corresponding to the sum weight equal or nearest to the target weight. Such combination is composed of the contents of two auxiliary hoppers 18a and 18i in the example of operation shown in FIG. 8.

Figure 7A:
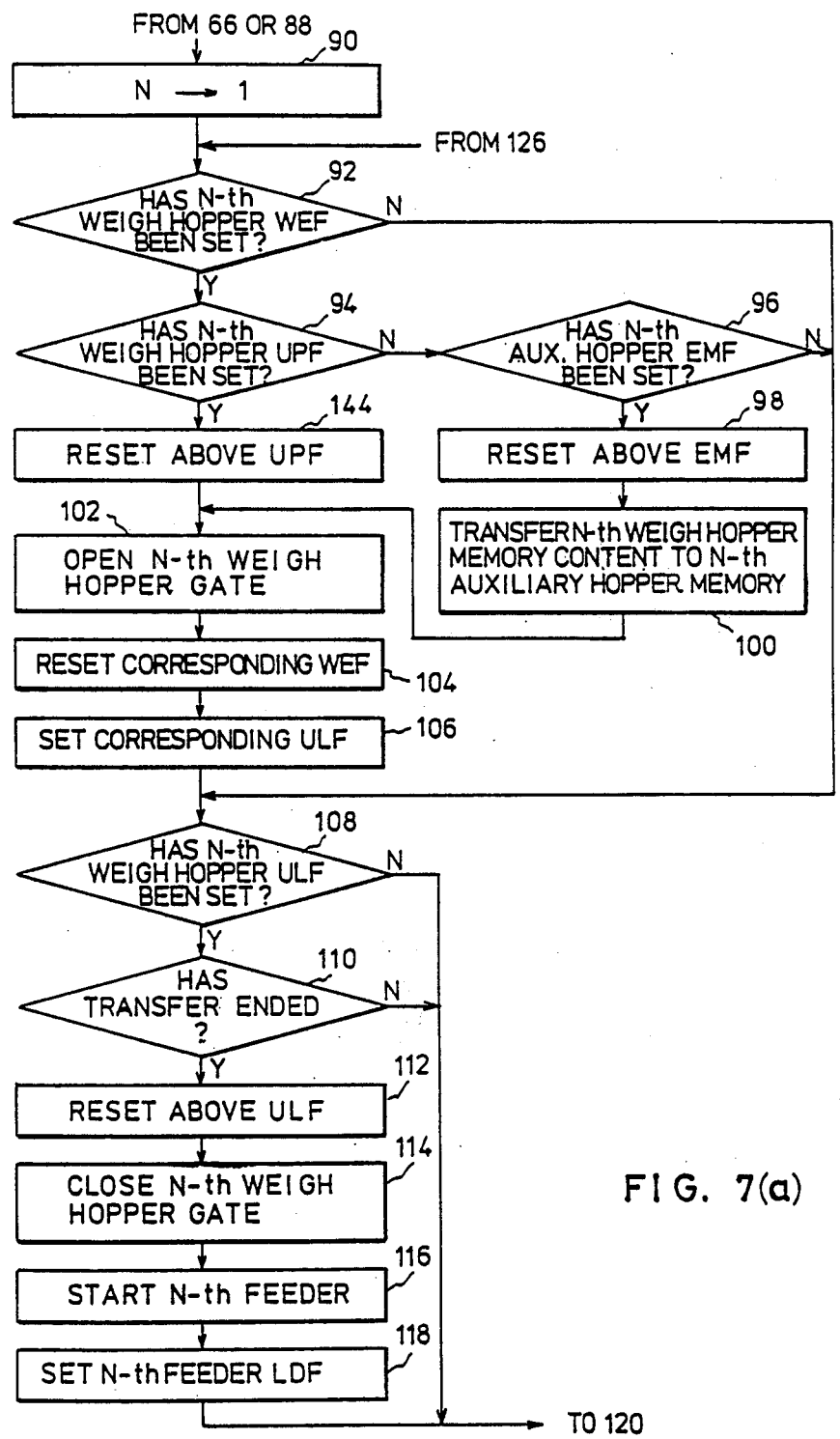
Figure 7B:
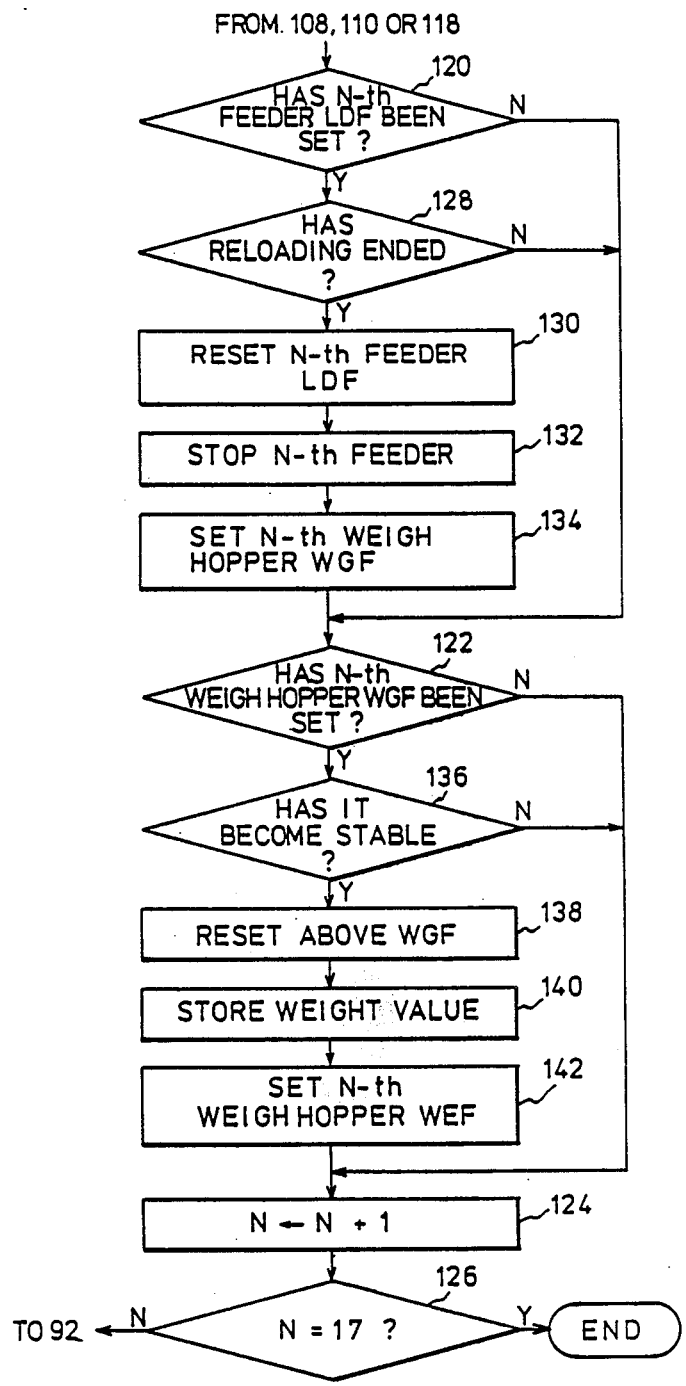

In the next step 36, it is inquired whether the wanted combination has been obtained or not. When it has been obtained as in the example of FIG. 8, the computation end flag CEF is set in step 38, the obtained combination composed of selected hoppers is stored in the memory in step 40 and the program returns to the first step 30. The above-mentioned combination operation is executed within a time interval $t_0$ to $t_1$ of FIG. 8, which is about 0.2 second, for example. During this time interval, twenty (20) interrupt signals are generated, for example, and an auxiliary hopper sequence as shown in FIG. 6 and a weighing hopper sequence as shown in FIGS. 7(a) and 7(b) are executed every time the interrupt signal is generated.

In FIG. 6, it is inquired, in step 46, whether the inner chute 4 is available or not and, "if not", it is inquired, in step 68, whether the outer chute 6 is available or not. The inner and outer chutes 4 and 6 are made available by discharge command signals from the packing machine 12 but such command signals are not provided at first. Therefore, the program jumps to step 60 and it is inquired whether the inner unloading flag IUF has been set or not. If not, it is inquired, in step 82, whether the outer unloading flag OUF has been set or not. As aforedescribed, these flags are reset at first, the program jumps to step 90 of the weighing hopper sequence in FIG. 7(a).

In step 90, the count of a counter in the microcomputer 28 is set to one (1). This count corresponds to the suffix of the reference numeral 18, 20 or 26 and, for example, one (1) corresponds to suffix "a". Therefore, in this case, it is inquired, in step 82, whether the weighing end flag WEF for weighing hopper 20a has been set or not. As the weighing end flags for all weighing hoppers are set initially as afore-described, it is inquired, in step 94, whether the unloading participation flag UPF of weighing hopper 20a has been set or not. As this flag is reset at first, it is inquired, in step 96, whether the empty flag EMF of auxiliary hopper 18a has been set or not. As this flag is also reset at first, the program jumps to step 108 and it is inquired whether the unloading flag ULF of weighing hopper 20a has been set or not. As this flag is also reset at first, it is inquired next, in step 120 (FIG. 7b), whether the loading device flag LDF of trough feeder 26a has been set or not. As this flag is also reset at first, it is inquired, in step 122, whether the weighing flag WGF of weighing hopper 20a has been set or not. As this flag is also reset at first, the count N of the counter is incremented by one, that is, to two (2) in step 124 and it is inquired whether the count N equals to 17 corresponding to the last "p" or not in step 126. As the answer is now "NO", the program returns to step 92 and the same steps are repeated until the count N reaches 17.

At time $t_1$, the interrupt signal is provided again and the auxiliary hopper sequence of FIG. 6 is executed. At this time, a discharge command signal for inner chute 4 is provided from the packing machine 12 and the inner chute 4 becomes available for unloading the weighed product. Therefore, the answer in step 46 is "YES" and it is inquired, in step 48, whether the computation end flag CEF has been set or not. As this flag has been set already in step 38 in FIG. 4, the unloading participation flags UPF of the weighing hoppers selected in the wanted combination are set in step 50. In the first combination computation, however, the combination is selected only from the auxiliary hoppers whose empty flags EMF are reset and, therefore, the flags UPF are never set. Next, the empty flags EMF of the auxiliary hoppers selected in the wanted combination, namely, hoppers 18a and 18i in this case, are set in step 52 and these auxiliary hoppers are driven by a discharge start signal to start discharge of the contents into the inner chute 4 in step 54. Then, the inner unloading flag IUF is set in step 56 and the computation end flag CEF is reset in step 58. Thereafter, it is inquired, in step 60, whether the inner unloading flag IUF has been set or not. As this flag was set in step 56, it is inquired, in step 62, whether the unloading operation has ended or not. This judgement is effected by inspecting lapse of a predetermined time, 0.2 second for example, after the start of the discharge start signal. If the unloading operation has not yet ended, it is inquired, in step 82, whether the outer unloading flag OUF has been set or not. As this flag is reset at first, the program jumps to step 90 of the weighing hopper sequence as shown in FIG. 7. This sequence is executed as described above.

Upon completion of the weighing hopper sequence, the program returns to step 30 of FIG. 4 and steps 30 and 42 are repeated until the time point $t_2$ since the answers in these steps are still "NO".

At time $t_2$, an answer "YES" is provided in step 42 by an initial setting of the microcomputer and the next step 44 is executed. In step 44, a predetermined weight value W2 which is different from (greater than, in this embodiment,) W1 is set as the target weight $W_T$ and another predetermined weight value Wb which is greater than W2 is set as the allowable upper limit $W_{UL}$. Then, the second combination computation similar to the above-described first computation is effected in step 34 and, in this embodiment, four auxiliary hoppers 18d, 18g, 18l and 18o are selected in the wanted combination. This combination is stored in the memory in step 40 to complete the combination computation at time $t_3$ as shown in FIG. 8. The length of time from $t_2$ to $t_3$ is about 0.2 second, for example. The auxiliary hoppers 18a and 18i which were selected in the preceding combination are never selected in this combination, since their empty flags EMF were set in step 52.

During the period $t_2$–$t_3$, the auxiliary hopper sequence and the weighing hopper sequence are repeated as described above in response to the interrupt signals. At time $t_4$ between $t_2$ and $t_3$, an answer "YES" is provided in step 62 by the initial setting of the microcomputer. Consequently, in step 64, a discharge end signal is applied to the auxiliary hoppers 18a and 18i whose inner unloading flags IUF were set in step 56, to close their gates and, in step 66, these IUFs are reset.

During excution of the weighing hopper sequence in which the count N is one (1), the answer of step 96 is "YES" since the empty flag EMF of the corresponding auxiliary hopper 18a was set in step 52. Therefore, this EMF is reset in step 98 and the content of the weighing hopper memory of weighing hopper 20a is transferred to the auxiliary hopper memory of auxiliary hopper 18a in step 100. Thereafter, a gate opening signal is applied to weighing hopper 20a to open its gates 24 for starting transfer of the content of hopper 20a to hopper 18a in step 102, the weighing end flag WEF of weighing hopper 20a is reset to step 104 and the unloading flag ULF of this hopper 20a is set in step 106.

Accordingly, the answer in step 108 is "YES" and it is then inquired, in step 110, whether the transfer operation has ended or not. This judgement is effected by inspecting lapse of a predetermined time, 0.2 second for example, after the gate opening signal is provided. If not, the steps 120, 122, 124 and 126 are executed and the program returns to step 92. Thereafter, the same steps are repeated and the count N is incremented by one every time in step 124. When N=9, the answer of step 96 is "YES" and the steps 98, 100, 102, 104 and 106 are executed as in the case of N=1, thereby stopping discharge from the auxiliary hopper 18i and starting transfer from the weighing hopper 20i to that hopper 18i.

At time t3, the auxiliary and weighing hopper sequences are executed again in response to the interrupt signal. While, in this case also, steps 46 and 68 are executed in turn, a discharge command signal for the outer chute 6 has been provided from the packing machine. Accordingly, steps 70, 72, 74, 76, 78, 80 and 60 are executed in this order. These steps are analogous the previously executed steps 48, 50, 52, 54, 56, 58 and 60, except that, in step 76, the contents of auxiliary hoppers 18d, 18g, 18l and 18o are discharged into the outer chute 6 and that, in step 78, the outer unloading flag OUF is set. After step 60, step 82 is similarly executed. However, as OUF has been set, it is then inquired, in step 84, whether the unloading operation has ended or not. As it has not yet ended at that time, steps 90, 92, 108, 110, 120, 122, 124 and 126 of the weighing hopper sequence are executed and the program returns to step 92. Thereafter, the same steps are repeated until N=17 is for example reached in step 216.

At time t5 which is 0.5 second after time t3, the auxiliary and weighing hopper sequences are executed again in response to the interrupt signal. As the unloading operation has not yet ended at this time, steps 46, 68, 60, 82 and 84 of the auxiliary hopper sequence are again executed and the program jumps to the weighing hopper sequence while leaving the gates of auxiliary hoppers 18d, 18g, 18l and 18o open. In the weighing hopper sequence, steps 90, 92, 108 and 110 are executed sequentially. The transfer operation from weighing hoppers 20a and 20i has ended already by this time. Therefore, when N is set to one (1) in step 90 and steps 92, 108 and 110 are executed, the answer in step 110 is "YES" and the unloading flag ULF for weighing hopper 20a is set in step 112. Then, the gate 24 of weighing hopper 20a is closed in step 114 by a gate closing signal, trough feeder 26a is actuated by a loading signal to start reloading of weighing hopper 20a in step 116 and the loading flag LDF for feeder 26a is set in step 118. Therefore, steps 120 and 128 are executed and, as the reloading has not yet finished, steps 122, 124 and 126 are executed. Then, the progrms returns to step 92 and similar steps are repeated and the count N is incremented in step 124. When N=9 during this repetition, the gate of weighing hopper 20i is closed in step 114 and trough feeder 26i begins to reload this hopper in step 116 as in the case of N=1.

Upon completion of the weighing hopper sequence, the third combination computation sequence starts. In this sequence, steps 30, 32, 34, 36, 38 and 40 are executed sequentially and the first target weight W1 and upper limit Wa are used. It is assumed that this sequence has been executed within a time interval of 0.2 second between times t5 and t6 in FIG. 8 and two auxiliary hoppers 18a and 18p have been selected. At time t7 between t5 and t6, approximately 0.1 second after time t5, the computation sequence is interrupted by the interrupt signal to execute the auxiliary and weighing hopper sequences. While, in the auxiliary hopper sequence, steps 46, 68, 60, 82 and 84 are executed sequentially, the answer in step 84 is "YES" since the unloading operation from auxiliary hoppers 18d, 18g, 18l and 18o into the outer chute 6 has ended already. Therefore, the gates of these hoppers are closed in step 86 and the outer unloading flags OUF for these hoppers are reset in step 88. Then, the weighing hopper sequence is executed.

At this time t7, steps 92, 108, 120, 128, 122, 124 and 126 are executed. When N=1 or N=9, the weighing end flag WEF, unloading flag ULF and weighing flag WGF for weighing hopper 20a or 20i have been reset, the loading flag LDF for trough feeder 26a or 26i has been set and the reloading operation of these hoppers 20a and 20i has not yet ended. When N=4, 7, 12 or 15 is set, however, steps 92, 94, 96, 98, 100, 102, 104, 106, 108, 110, 120, 122, 124 and 126 are executed, since for weighing hopper 20d, 20g, 20l or 20o and the corresponding auxiliary and trough feeder WEF, EMF and ULF have been set, UPF, LDF and WGF have been reset and the transfer operation has not yet ended. Thus, in step 100, the transfer operation from weighing hoppers 20d, 20g, 20l and 20o to the underlying auxiliary hoppers is started. With the remaining values of N, steps 92, 94, 96, 108, 120, 122, 124 and 126 are repeated.

At time t6, the auxiliary and weighing hopper sequences are executed. At this time, the second discharge command signal for the inner chute 4 has been provided and it is therefore understood that steps 46, 48, 50, 52, 54, 56, 58, 60, 62 and 82 are executed to start discharge of the content of auxiliary hoppers 18a and 18p into the inner chute 4 and the program progresses to the weighing hopper sequence.

In this sequence, steps 90, 92, 108, 120 and 128 are executed sequentially since the reloading operation of weighing hoppers 20a and 20i has ended already. With N=1 or 7, therefore, the answer in step 128 is "YES", so that the loading flag LDF for trough feeder 26a or 26i is reset in step 130. These feeders are stopped by a stop signal in step 132 and the weighing flag EGF for weighing hopper 20a or 20i is set in step 134. Next, in step 122, it is inquired whether WGF for weighing hopper 20a or 20i has been set or not. As the answer is of course "YES", it is inquired in step 136 whether this weighing hopper has become stable or not. This judgment is effected by inspecting lapse of a predetermined time, 0.7 second for example, after occurence of the stop signal in step 132. It has not yet lapsed in this case and steps 124 and 126 are executed to return to step 92. With N=4, 7, 12 or 15, however, the unloading flag ULF has been set in step 106. Thus the transfer operation from the corresponding weighing hopper 20d, 20g, 20l or 20o has not yet ended at this time and steps 92, 108, 110, 120, 122, 124 and 126 are executed to continue transfer to auxiliary hoppers 18d, 18g, 18l and 18o.

At time $t_8$, 0.1 second after time $t_6$ as shown in FIG. 8, the fourth combination computation sequence starts and, at time $t_9$, it ends. It is assumed that auxiliary hoppers 18c, 18h, 18k and 18m are selected by this computation.

By similarly executing the abovementioned sequences, discharge from auxiliary hoppers 18a and 18p is ended and transfer thereto from weighing hoppers 20a and 20p is commenced at time $t_{10}$ between times $t_8$ and $t_9$. In this case, however, weighing hopper 20a is in weighing operation and the weighing end flag WEF therefor has been reset. Therefore, the program jumps from step 92 to step 108 and no transfer to auxiliary hopper 18a is effected.

At time $t_9$, the contents of the selected auxiliary hoppers 18c, 18h, 18k and 18m are discharged into the outer chute 6.

At time $t_{11}$, 0.1 second after time $t_9$, the transfer operation from weighing hopper 20p to auxiliary hopper 18p is ended and the reloading operation for the emptied hopper 20p is commenced. The fifth combination computation starts at time $t_{11}$ and ends at time $t_{12}$, thereby two auxiliary hoppers are selected, for example, as shown in FIG. 8.

At time $t_{13}$ between times $t_{11}$ and $t_{12}$, the unloading operation of auxiliary hoppers 18c, 18h, 18k and 18m is ended and transfer of the contents of the corresponding weighing hoppers 20c, 20h, 20k and 20m to the emptied auxiliary hoppers is commenced. At time $t_{12}$, discharge from the selected auxiliary hoppers 18d and 18j into the inner chute 4 commences.

At time $t_{14}$, 0.1 second after time $t_{12}$, the auxiliary and weighing hopper sequence are executed as aforedescribed. In the weighing hopper sequence, steps 90, 92, 108, 120, 122 and 136 are executed with N=1 or 9. The corresponding weighing hoppers 20a and 20i have become stable at that time and, therefore, the weighing flags WGF for these hoppers are reset in step 138, the weight values from these hoppers are stored in the memory in step 140 and the weighing end flags WEF for these hoppers are set in step 142, thereby completing the weighing operation of weighing hoppers 20a and 20i. At this time also, the transfer operation to auxiliary hoppers 18c, 18h, 18k and 18m ends and the reloading operation of weighing hoppers 20c, 20h, 20k and 20m commences.

At the same time, the sixth combination computation sequence commences. At this time, the weighed content of weighing hopper 20a is transferred to the underlying auxiliary hopper 18a. In this case, the weight value is transferred immediately from the weighing hopper memory to the auxiliary hopper memory prior to initiation of combination step 34 but the transfer of articles may end after the step 34. Therefore, the articles being transferred to auxiliary hopper 18a may be selected together with the articles which have been transferred previously to auxiliary hoppers 18b, 18f and 18n, as shown in FIG. 8 for example. In such case, the articles transferred from weighing hopper 20a to auxiliary hopper 18a are discharged at time $t_{15}$ without staying in the hopper 18a, together with the other selected hoppers.

In the combination computation sequence of FIG. 4, if the answer of step 36 is "NO", the computation is effected by another method through steps 146 and 148. The above-described combination computation has been effected only with the weight values stored in the auxiliary hopper memories. The number of objects of combination selection will be increased by using the weight values stored in the weighing hopper memories. However, when a weighing hopper is selected but the underlying auxiliary hopper is not selected in the wanted combination, the content of the selected weighing hopper can be unloaded. However, if a weighing hopper and the underlying auxiliary hopper are selected at the same time, they can be unloaded. The combination computation in step 146 is effected in accordance with this theory by using a special combination pattern as shown in the following table.

TABLE

| Set No. | Weighing and auxiliary hoppers 20 and 18 | | | | | | | | |
|---|---|---|---|---|---|---|---|---|---|
| | a | b | c | d | e | f | ... | o | p |
| 1 | 1 | 0 | 0 | 0 | 0 | 0 | | 0 | 0 |
| 2 | 2 | 0 | 0 | 0 | 0 | 0 | | 0 | 0 |
| 3 | 0 | 1 | 0 | 0 | 0 | 0 | | 0 | 0 |
| 4 | 1 | 1 | 0 | 0 | 0 | 0 | | 0 | 0 |
| 5 | 2 | 1 | 0 | 0 | 0 | 0 | | 0 | 0 |
| 6 | 0 | 2 | 0 | 0 | 0 | 0 | | 0 | 0 |
| 7 | 1 | 2 | 0 | 0 | 0 | 0 | | 0 | 0 |
| 8 | 2 | 2 | 0 | 0 | 0 | 0 | | 0 | 0 |
| 9 | 0 | 0 | 1 | 0 | 0 | 0 | | 0 | 0 |
| 10 | 1 | 0 | 1 | 0 | 0 | 0 | | 0 | 0 |

This combination pattern is composed of tirnary codes, as will be readily understood, and it is initially prescribed that the ternary code "1" means only the auxiliary hopper being combined and the ternary code "2" means both the weighing and auxiliary hoppers being combined. For example, No. 4 combination consists of auxiliary hoppers 18a and 18b, while No. 7 combination consists of auxiliary hoppers 18a and 18b and weighing hopper 20b. According to this combination pattern, each weighing hopper can participate in the combination together with its underlying auxiliary hopper. While this combination pattern includes $2^{16}$-1 sets of combinations which consist of auxiliary hoppers only which combination were already generated in the computation in step 34, they may be omitted from the table for saving time.

When a desired combination has been obtained, the program progresses through steps 148, 38 and 40 and returns to step 30 but, if a desired combination is not obtained, it returns from step 148 directly to step 30. When the auxiliary hopper sequence is subsequently executed, the unloading participation flags UPF for the selected weighing hoppers are set in step 50 or 72 and the selected underlying auxiliary hoppers begin to discharge their contents in step 54 or 76. In the weighing hopper sequence which follows, steps 92, 94, 144, 102, 104 and 106 are executed for the selected weighing hoppers since the weighing end flags WEF and unloading participation flags UPF for these hoppers have been set. Thus, the selected weighing hoppers begin to discharge their contents in step 102. As the underlying auxiliary hoppers are discharging their content at this time, the discharged contents of weighing hoppers pass through these auxiliary hoppers.

While, in the above embodiment, the combination computation has been effected with not only the articles held in the auxiliary hoppers but also the articles on the way from the weighing hoppers to the underlying auxiliary hoppers, it can be effected only with the articles kept in the auxiliary hoppers. In this case, however, steps 94, 96 and 144 are omitted from the weighing hopper sequence and steps 98 and 100 are inserted between steps 110 and 112. Moreover, steps 50 and 72 are omitted from the auxiliary hopper sequence and steps 146 and 148 are omitted from the computation sequence.

While, in the above embodiment, the special combination computation step 146 is used only when no desired combination is obtained by the regular step 34, it is possible to use only the special step 146 by omitting the steps 34 and 36 from the combination sequence.

In the above embodiment, three deliveries of product are effected within each weighing cycle. However, as the delivery is effected in response to the control signal from the microcomputer 28, the number of deliveries per weighing cycle can be changed by suitably selecting the period of control signal. In this embodiment, the deliveries are effected alternately from the inner and outer chutes 4 and 6 by the discharge start signals with a specific time delay therebetween. However, if necessary, the deliveries from both chutes 4 and 6 can be effected at the same time by changing the timing of the discharge signals.

Moreover, though one delivery is effected from one chute between two successive deliveries from the other chute in the above embodiment, a plurality of deliveries can be effected from one chute between two successive deliveries from the other chute in accordance with this invention. Such modified embodiment will be described below.

Figure 9:
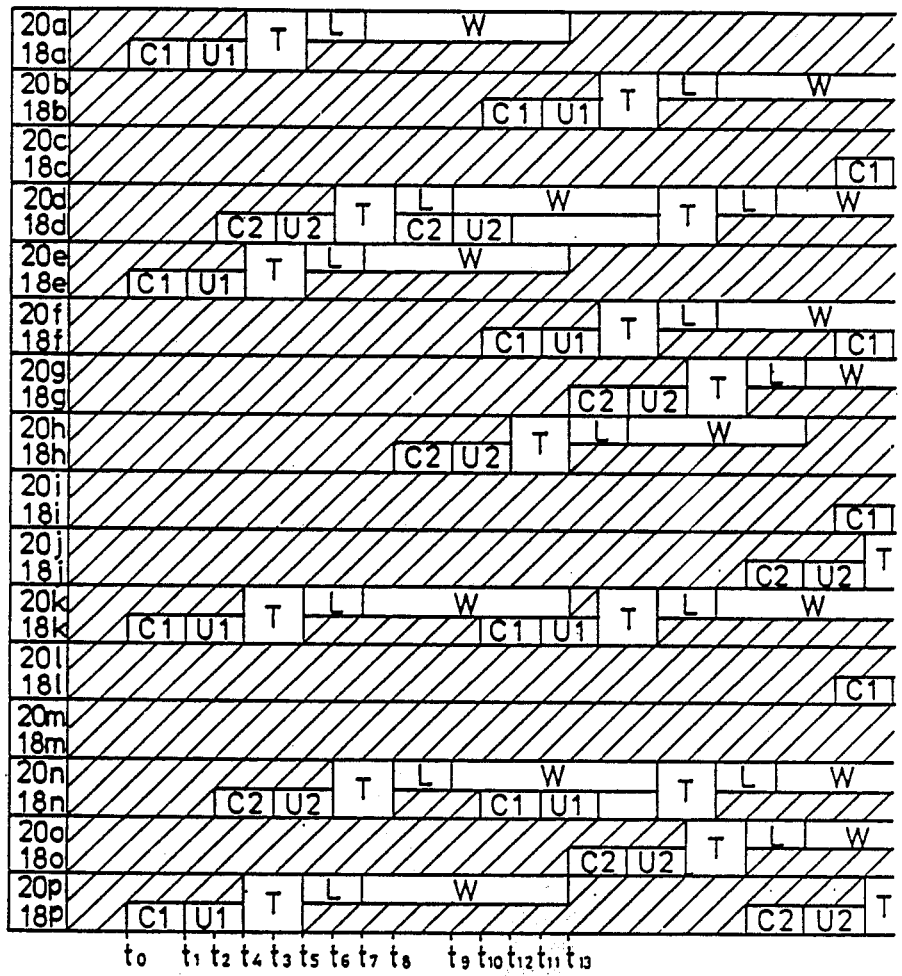
FIG. 9 is a timing diagram representing an operation of the combination weighing machine operated in the second embodiment of this invention.

While the predetermined time intervals T1 and T2 in steps 30 and 42 in FIG. 4, which correspond to the time delay from the beginning of discharge to the beginning of combination for the inner and outer chutes 4 and 6, are both equal to 0.6 second, for example, in the above embodiment, they are different from each other in this embodiment. For example, T1 equals 1.0 second, while T2 equals 0.4 second. When the time intervals T1 and T2 are selected like this, the answer of step 42 becomes "YES" twice, while the answer of step 30 becomes "YES" once. Therefore, each combination computation with target weight W1 is followed by two combination computations with target weight W2 and such operation results in a timing chart as shown in FIG. 9. Although no further description will be made on this drawing as it is self-explanatory, it should be understood that each delivery from the inner chute is followed by two deliveries from the outer chute. The ratio of deliveries from both chutes can be changed by changing the ratio of T1 and T2. The program of this embodiment is same as that of the first embodiment but it is easily appreciated that the discharge command signals provided in steps 46 and 68 from the packing machine must be timed in coincidence with the ratio of T1 and T2.

Similar modifications as described in connection with the first embodiment can be made also for this embodiment with in the scope of the invention.

We claim:

1. A combination weighing method using a combination weighing machine of the type comprising a plurality of weighing hoppers and a plurality of auxiliary hoppers corresponding respectively to said weighing hoppers for receiving weighed product therefrom, said auxiliary hoppers being adapted to discharge product for delivery to two receiving devices; said method including:

a first step involving feeding product to empty auxiliary hoppers from respective weighing hoppers;

a second step involving feeding new product to empty weighing hoppers to weigh said product; and a third step in parallel with execution of said first and second steps, involving computing predetermined combinations of the weights of product which have been fed to said auxiliary hoppers and selecting therefrom a combination whose total weight is equal or approximate to a predetermined reference weight for delivery to either of said two receiving devices;

characterized in that said third step includes a substep involving changing said reference weight so that said two receiving devices are supplied with combinations of product determined by using different reference weights.

2. A method as set forth in claim 1 characterized in that said reference weight is changed every occurrence of said third step.

3. A method as set forth in claim 1 characterized in that said reference weight is changed only after a plurality of occurrences of said third step.

4. A method as set forth in claim 1 characterized in that said two receiving devices are supplied alternately.

5. A method as set forth in claim 1 characterized in that said two receiving devices are supplied concurrently.

6. A method as set forth in claim 1 characterized in that said receiving devices are packing machines.

7. A method as set forth in claim 1 characterized in that said third step is executed in response to command signals from said receiving devices.

8. A combination weighing method using a combination weighing machine of the type comprising a plurality of weighing hoppers, each having an auxiliary hopper corresponding thereto for receiving weighed product therefrom, said auxiliary hoppers being adapted to discharge product for delivery to two receiving devices; said method including:

a first step involving feeding product to empty auxiliary hoppers from respective weighing hoppers;

a second step involving feeding new product to empty weighing hoppers to weigh said product; and a third step in parallel with execution of said first and second steps, involving computing predetermined combinations of the weights of product which have been fed to said auxiliary hoppers and product in transit from said weighing hoppers to said emptied auxiliary hoppers and selecting therefrom a combination whose total weight is equal or approximate to a predetermined reference weight for delivery to either of said two receiving devices;

characterized in that said third step includes a substep involving changing said reference weight so that said two receiving devices are supplied with combinations of product determined by using different reference weights.

9. A method as set forth in claim 8 characterized in that said reference weight is changed every occurrence of said third step.

10. A method as set forth in claim 8 characterized in that said reference weight is changed only after a plurality of occurrences of said third step.

11. A method as set forth in claim 8 characterized in that said two receiving devices are supplied alternately.

12. A method as set forth in claim 8 characterized in that said two receiving devices are supplied concurrently.

13. A method as set forth in claim 8 characterized in that said receiving devices are packing machines.

14. A method as set forth in claim 8 characterized in that said third step is executed in response to command signals from said receiving devices.

15. A combination weighing method using a combination weighing machine of the type comprising a plurality of weighing hoppers and a plurality of auxiliary hoppers corresponding respectively to said weighing hoppers for receiving weighed product therefrom, said auxiliary hoppers being adapted to discharge product for delivery to two receiving devices; said method including:

a first step involving feeding product to empty auxiliary hoppers from respective weighing hoppers;

a second step involving feeding new product to empty weighing hoppers to weight said product; and a third step in parallel with execution of said first and second steps, involving computing predetermined combinations of at least the weights of product which have been fed to said auxiliary hoppers and the sum weights of product contained in each pair of corresponding weighing and auxiliary hoppers and selecting therefrom a combination whose total weight is equal or approximate to a predetermined reference weight for delivery to either of said two receiving devices;

characterized in that said third step includes a substep involving changing said reference weight so that said two receiving devices are supplied with combinations of product determined by using different reference weights.

16. A method as set forth in claim 15 characterized in that said reference weight is changed every occurrence of said third step.

17. A method as set forth in claim 15 characterized in that said reference weight is changed only after a plurality of occurrences of said third step.

18. A method as set forth in claim 15 characterized in that said two receiving devices are supplied alternately.

19. A method as set forth in claim 15 characterized in that said two receiving devices are supplied concurrently.

20. A method as set forth in claim 15 characterized in that said receiving devices are packing machines.

21. A method as set forth in claim 15 characterized in that said third step is executed in response to command signals from said receiving devices.

22. A combination weighing method using a combination weighing machine of the type comprising a plurality of hoppers each adapted for unloading a weighed amount of product therefrom to contribute to a delivery of product, a first receiving device adapted for receiving from said hoppers deliveries of weighed product each having an acceptable weight relative to a first predetermined reference weight, and a second receiving device adapted for receiving from said hoppers deliveries of weighed product each having an acceptable weight relative to a second predetermined reference weight different from said first predetermined reference weight, said method involving for each delivery a cycle of steps comprising:

making a combination search to select a combination of said hoppers to be unloaded to deliver a quantity of product of an acceptable weight relative to either said first predetermined reference weight or said second predetermined reference weight;

unloading the hoppers of the selected combination to deliver said quantity of product to the appropriate receiving device; and loading the hoppers which were unloaded;

said method further comprising intermittently changing between using said first and second predetermined reference weights in the combination search step of subsequent cycles to effect successive deliveries of product to intermittently changing receiving devices.

23. A combination weighing machine comprising:

a plurality of hoppers each adapted for unloading a weighed amount of product therefrom to contribute to a delivery of product;

means for making a combination search to select a combination of said hoppers to be unloaded to deliver a quantity of product of an acceptable weight relative to either a first predetermined reference weight or a second predetermined reference weight different from said first predetermined reference weight, said means being operable to intermittently change between using said first and second predetermined reference weights in successive combination searches;

means for unloading the hoppers of a selected combination to deliver said quantity of product to one of two receiving devices depending on the reference weight used in the combination search; and means for loading the hoppers which were unloaded.

24. A combination weighing machine as set forth in claim 23 further comprising a first collection device for collecting deliveries of weighed product each having an acceptable weight relative to said first predetermined reference weight and directing said deliveries to one of said receiving devices, and a second collection device for collecting deliveries of weighed product each having an acceptable weight relative to said second predetermined reference weight and directing said deliveries to the other of said receiving devices.

* * * * *